(No Model.)
S. C. WHITLOW.
SEAT OR SADDLE SUPPORT FOR BICYCLES, &c.
No. 602,389. Patented Apr. 12, 1898.
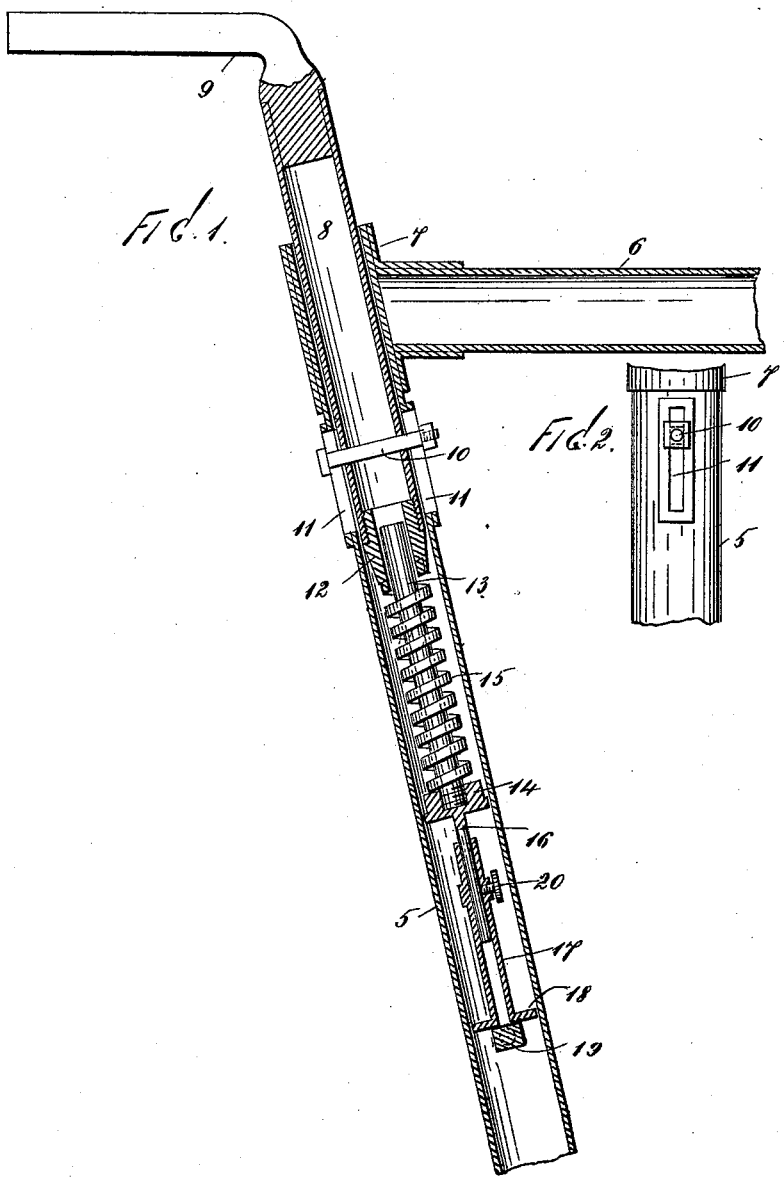
WITNESSES
John Buckler
C. Gerst
INVENTOR
Samuel C. Whitlow
BY
Edgar Tate & Co.
ATTORNEYS.

UNITED STATES PATENT OFFICE.

SAMUEL CHARLES WHITLOW, OF NEWBURG, NEW YORK.

SEAT OR SADDLE SUPPORT FOR BICYCLES, &c.

SPECIFICATION forming part of Letters Patent No. 602,389, dated April 12, 1898.

Application filed February 25, 1897. Serial No. 624,955. (No model.)

*To all whom it may concern:*

Be it known that I, SAMUEL CHARLES WHITLOW, a citizen of the United States, residing at Newburg, in the county of Orange and State of New York, have invented certain new and useful Improvements in Seat or Saddle Supports for Bicycles and Similar Vehicles, of which the following is a full and complete specification, such as will enable those skilled in the art to which it appertains to make and use the same.

This invention relates to supports for the seats or saddles of bicycles and similar vehicles; and the object thereof is to provide the seats or saddles of vehicles of this class with a spring-support which is simple in construction and operation and which is adapted to be connected with the frame of such vehicles as usually constructed.

The invention is fully disclosed in the following specification, of which the accompanying drawings form a part, in which the separate parts of my improvement are designated by the same numerals of reference in each of the views, and in which—

Figure 1 is a sectional side view of a portion of the frame of a bicycle provided with my improvement, and Fig. 2 a rear view of a part thereof.

In the drawings forming part of this specification I have shown at 5 the tubular rod which extends from the support of the seat or saddle to the support of the pedal-shaft, said last-named support being not shown, and at 6 I have shown the upper horizontal rod which is connected with the tubular rod 5 by a tubular coupling-head 7, which is brazed to said tubular rod or secured thereto in any desired manner.

Mounted in the upper end of the tubular rod 5 is a short rod 8, which is also preferably tubular in form and with the upper end of which is connected a backwardly-directed arm 9, with which the seat or saddle is connected in the usual manner, said seat or saddle being not shown.

The lower end of the rod 8 extends downwardly into the tubular rod 5 a predetermined distance, and passing transversely therethrough is a bolt 10, which passes through longitudinal slots or openings 11 at the opposite sides of the tubular rod 5, and the lower end of the rod 8 is provided with a tubular screw-threaded plug 12, into which passes a shaft 13, the lower end of which is connected with a head 14, and wound on the shaft 13 is a spring 15, one end of which rests on the head 14, and the upper end of which is secured to the tubular plug 12.

The head 14 is provided centrally of its lower side with a downwardly-directed rod 16, which passes into a tube 17, which is preferably provided at its lower end with a flange or rim 18, which rests on a cross-bar 19, rigidly secured in the tubular rod 5, and the rod 16 of the head 14 is vertically adjustable in the tube 17 by means of a set-screw 20.

The spring 15 need not necessarily be rigidly connected with the tubular plug 12, and it will be apparent that other changes in and modifications of the construction herein described may be made without departing from the spirit of my invention or sacrificing its advantages.

My improvement is well adapted to accomplish the result for which it is intended, and by means thereof the rod 8, which supports the seat, is free to move in the tubular rod 5 of the frame of the vehicle and is supported by the spring 15, and the rod or bolt 10, which passes through the rod 8 and through the slots 11 in the tubular rod 5, serves as a guide to prevent the rod 8 from turning and to hold the same in proper relative position with reference to the tubular rod 5.

Having fully described my invention, I claim as new and desire to secure by Letters Patent—

A seat or saddle support for bicycles, comprising the combination with a bicycle-frame of a tubular rod 8 having an arm 9; a bolt 10 mounted in said tubular rod and passing through slots 11 in the tubular rod 5, of the frame; a plug 12 mounted in the tubular rod 8; a shaft 13 adapted to pass therethrough; a head 14, connected therewith; a spring 15 mounted on said shaft; a rod 16 secured to said head; a tube 17 in which the rod 16 is slidably mounted; a set-screw 20 to engage the same; a cross-bar 19 mounted in the tubular rod 5 said tube 17 being provided with a pin 18, substantially as and for the purpose set forth.

In testimony that I claim the foregoing as my invention I have signed my name, in presence of the subscribing witnesses, this 20th day of February, 1897.

SAMUEL CHARLES WHITLOW.

Witnesses:
 HENRY KOHL,
 GEO. W. MAY.